(12) United States Patent
Ruiz Martinez et al.

(10) Patent No.: US 10,464,356 B2
(45) Date of Patent: Nov. 5, 2019

(54) TRANSMISSION LINK ASSEMBLIES

(71) Applicants: HEWLETT-PACKARD DEVELOPMENT COMPANY, L.P., Houston, TX (US); Eduardo Ruiz Martinez, Sant Cugat del Valles (ES); Ernesto Carrera Moran, Sant Cugat del Valles (ES); Alfons Lobete Camps, Sant Cugat del Valles (ES)

(72) Inventors: Eduardo Ruiz Martinez, Sant Cugat del Valles (ES); Ernesto Carrera Moran, Sant Cugat del Valles (ES); Alfons Lobete Camps, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 51 days.

(21) Appl. No.: 15/546,335

(22) PCT Filed: Apr. 24, 2015

(86) PCT No.: PCT/EP2015/058934
§ 371 (c)(1),
(2) Date: Jul. 26, 2017

(87) PCT Pub. No.: WO2016/169619
PCT Pub. Date: Oct. 27, 2016

(65) Prior Publication Data
US 2018/0022121 A1    Jan. 25, 2018

(51) Int. Cl.
*B41J 23/02* (2006.01)
*F16D 3/06* (2006.01)
*B41J 2/045* (2006.01)

(52) U.S. Cl.
CPC ............. *B41J 23/025* (2013.01); *B41J 2/045* (2013.01); *F16D 3/06* (2013.01)

(58) Field of Classification Search
CPC .. B41J 23/025; B41J 2/04505; B41J 2/04506; B41J 2/04508; B41J 2/04513;
(Continued)

(56) References Cited

U.S. PATENT DOCUMENTS 4,607,734 A     8/1986   Watashi
5,172,137 A  *  12/1992  Hongo ....................... B41J 2/32
                                                                  347/198

(Continued)

FOREIGN PATENT DOCUMENTS

EP       2415608        2/2012

OTHER PUBLICATIONS

IP.com search (Year: 2019).*

*Primary Examiner* — Lisa Solomon
(74) *Attorney, Agent, or Firm* — HP Inc. Patent Department

(57) ABSTRACT

An assembly comprises at least first and second transmission links. Each transmission link controls movement of a respective element coupled to a first side of the transmission link, under control of a common drive source coupled to a second side of the transmission link. A synchronizing unit is interposed between the first side and the second side of each transmission link, to synchronize movement of the respective elements by the common drive source.

16 Claims, 7 Drawing Sheets

(58) Field of Classification Search
CPC .. B41J 2/0453; B41J 2/04515; B41J 2/04518;
B41J 2/0452; B41J 2/04521; B41J
2/04523; B41J 2/04525; B41J 2/04531;
B41J 2/04563; B41J 2/04568; B41J
2/0457; B41J 2/04573; B41J 2/075; B41J
2/08; B41J 2/085; B41J 2/09; B41J
2/095; B41J 2/10; B41J 2/105; B41J
2/115; B41J 2/12; B41J 2/125; B41J
2/13; B41J 2002/022; B41J 2/04556;
B41J 2/04555; B41J 2/04553; B41J
2/04551; B41J 2/04548; B41J 2/04545;
B41J 2/04454; B41J 2/04538; B41J
2/04536; B41J 2/04535; B41J 2/04528;
B41J 2/04526; B41J 2/0451; B41J
2/04503; F16D 3/06
See application file for complete search history.

(56) References Cited

U.S. PATENT DOCUMENTS

| | | | | |
|---|---|---|---|---|
| 5,584,207 A * | 12/1996 | Paul | ................ | B66D 3/20 |
| | | | | 254/342 |
| 5,694,159 A | 12/1997 | Kajiya et al. | | |
| 5,949,470 A * | 9/1999 | Nakajima | ............ | H04N 1/0057 |
| | | | | 271/272 |
| 6,160,786 A * | 12/2000 | Coffin | ................ | G11B 15/6835 |
| | | | | 369/30.43 |
| 6,394,672 B1 * | 5/2002 | Murray | ................... | B41J 11/20 |
| | | | | 347/8 |
| 6,502,922 B2 | 1/2003 | Kawase et al. | | |
| 6,604,801 B2 * | 8/2003 | Park | ....................... | B41J 25/308 |
| | | | | 347/8 |
| 6,736,557 B2 * | 5/2004 | DeVore | ............... | B41J 25/3088 |
| | | | | 400/354 |
| 8,430,585 B2 | 4/2013 | Hendricks et al. | | |
| 8,500,345 B2 | 8/2013 | Macleod et al. | | |
| 8,506,047 B2 | 8/2013 | Wachter et al. | | |
| 8,602,191 B2 * | 12/2013 | Tai | ......................... | F16D 11/10 |
| | | | | 192/69.91 |
| 8,894,163 B2 * | 11/2014 | Gasser | ................... | F16H 21/40 |
| | | | | 312/319.5 |
| 2008/0309702 A1 | 12/2008 | Takahashi | | |
| 2012/0069089 A1 * | 3/2012 | Hendricks | ........... | B41J 25/3088 |
| | | | | 347/37 |
| 2012/0070217 A1 * | 3/2012 | Hendricks | ............. | B41J 25/304 |
| | | | | 400/352 |
| 2012/0325613 A1 | 12/2012 | Wen-Sheng et al. | | |
| 2014/0022293 A1 * | 1/2014 | Garvi | .................... | B41J 11/008 |
| | | | | 347/8 |
| 2014/0352486 A1 * | 12/2014 | Ruiz Martinez | ...... | F16D 63/008 |
| | | | | 74/531 |
| 2015/0138272 A1 * | 5/2015 | Campillo | ............. | B41J 2/16505 |
| | | | | 347/29 |
| 2017/0307418 A1 * | 10/2017 | Maya Agudo | ..... | G01D 5/34707 |
| 2017/0341438 A1 * | 11/2017 | Nishiyama | ........... | B41J 2/16538 |
| 2018/0022122 A1 * | 1/2018 | Sanjuan | ................... | B41J 2/155 |
| | | | | 347/37 |

* cited by examiner

TRANSMISSION LINK ASSEMBLIES

BACKGROUND

In some printers, a common drive source, for example a motor and associated drive gear, can be used to control movement of elements such as printheads, or a printbar comprising printheads. In such examples, multiple transmission links can be provided for controlling movement of the various elements, or for controlling movement of the printbar, whereby the multiple transmission links are controlled by the common drive source.

BRIEF DESCRIPTION OF DRAWINGS

Examples will now be described, by way of non-limiting example, with reference to the accompanying drawings, in which:

FIGS. 4b and 4c show further details of the example of FIG. 4a;

DESCRIPTION

Figure 1:
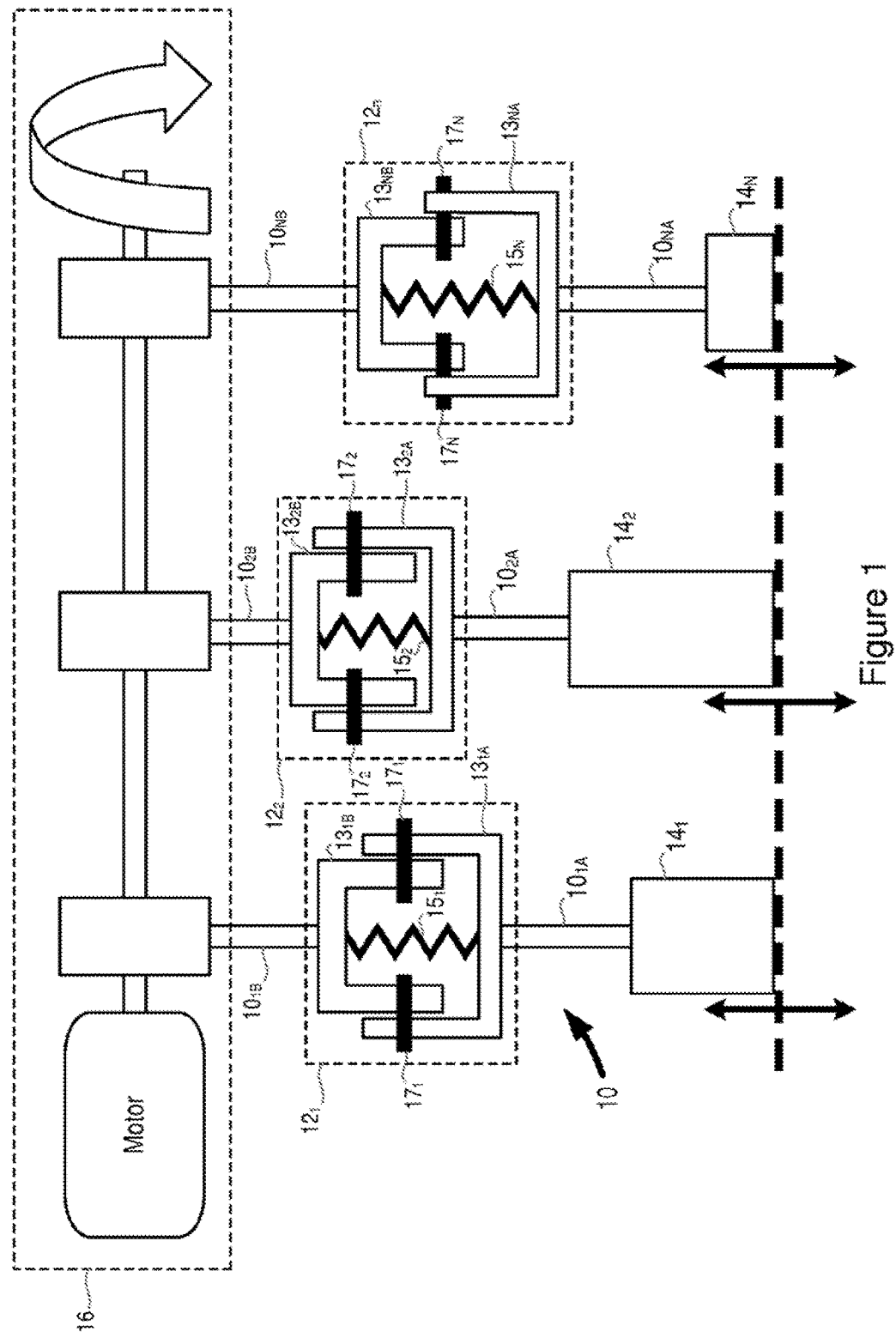
FIG. 1 is an example of an assembly according to the disclosure.

FIG. 1 shows an assembly according to a first example. The assembly comprises at least first and second transmission links 10, each transmission link 10 controlling movement of a respective element 14 coupled to a first side $10_A$ of the transmission link 10, under control of a common drive source 16 coupled to a second side $10_B$ of the transmission link 10. A synchronizing unit 12 is interposed between the first side $10_A$ and the second side $10_B$ of each transmission link 10, to synchronize movement of the respective elements 14 by the common drive source 16.

In the example shown, there are provided three transmission links 10, labelled $10_1$, $10_2$ and $10_N$ respectively. The first and second sides of transmission link $10_1$, for example, are labelled $10_{1A}$ and $10_{1B}$ respectively. It is noted that any plurality of transmission links 10 and corresponding elements 14 may be provided. The elements 14 may comprise separate or individual elements whose movement is to be controlled, as shown in FIG. 1. In another example (which will be described later in FIG. 3) the elements 14 form part of a common element, for example portions or locations on a printbar 14.

In one example, the synchronizing unit 12 is switchable between a locked mode of operation and an unlocked mode of operation. In the locked mode of operation the synchronizing unit 12 causes a respective element 14 to move in direct relationship to movement of the transmission link 10 into which the synchronizing unit 12 is interposed in the unlocked mode of operation the synchronizing unit 12 allows movement of the first side $10_A$ of the transmission link 10 relative to the second side $10_B$ of the transmission link 10, the relative movement being independent of the common drive source 16. This relative movement in the unlocked mode of operation can compensate, for example, for any differences in functional distance between the common drive source 16 and the respective elements 14.

The differences in functional distance, or functional length, may be caused for example by dimensional factors such as tolerances of component parts that constitute the transmission system, mechanism plays between component parts, backlash in the transmission system, deflections in various components parts, or other factors.

In the example of FIG. 1, the at least first and second transmission links 10 comprise elongated shafts to control linear movement along an axis corresponding to the axis of the elongated shafts. In such an example a synchronizing unit 12 may comprise a device body 13 comprising a female portion $13_A$ coupled to one side of the elongated shaft (for example the first side $10_A$), and a male portion $13_B$ coupled to the other side of the elongated shaft (for example the second side $10_B$). For example, for the first transmission link $10_1$ of FIG. 1, the synchronizing unit $12_1$ comprises a device body $13_1$ comprising a female portion $13_{1A}$ coupled to a first side $10_{1A}$ of the elongated shaft, and a male portion $13_{1B}$ coupled to a second side $10_{1B}$ of the elongated shaft. The same applies to the other transmission links $10_2$ and $10_N$ of FIG. 1.

In the example of FIG. 1, a synchronizing unit 12 further comprises a biasing element 15 to bias the female and male portions $13_A$, $13_B$ apart. The synchronizing unit 12 further comprises a locking member 17 to allow movement of the female portion $13_A$ relative to the female portion $13_B$ when the locking member 17 is in an unlocked position, and prevent movement of the female portion $13_A$ relative to the female portion $13_B$ when the locking member 17 is in a locked position. For example, for the first transmission link $10_1$ of FIG. 1, the synchronizing unit $12_1$ comprises a biasing element $15_1$ to bias the female and male portions $13_{1A}$, $13_{1B}$ apart. The synchronizing unit $12_1$ further comprises a locking member $17_1$ to allow movement of the female portion $13_{1A}$ relative to the male portion $13_{1B}$ when the locking member $17_1$ is in an unlocked position, and prevent movement of the female portion $13_{1A}$ relative to the male portion $13_{1B}$ when the locking member $17_1$ is in a locked position. The same applies to the other transmission links $10_2$ and $10_N$ of FIG. 1.

In one example the female portion $13_A$ is fixedly coupled to the first side $10_A$ of the transmission link 10, and the male portion $13_B$ fixedly coupled to the second side $10_B$ of the transmission link, or vice versa. For example, for the first transmission link $10_1$ of FIG. 1 the female portion $10_{1A}$ is fixedly coupled to the first side $10_{1A}$ of the transmission link 10, and the male portion $13_{1B}$ fixedly coupled to the second side $10_{1B}$ of the transmission link. It is noted that references to female and male portions $13_A$, $13_B$ are intended to embrace any structure of parts that cooperate to allow movement relative to one another when the locking member 17 is in the unlocked position, and do not necessarily need one portion to fit within the other during such movement.

The example of FIG. 1 allows movement of the elements 14, via control of the common drive source 16 and the transmission links 10, to be synchronized by the manner in which each synchronizing unit can effectively alter its length to compensate for structural differences or tolerances in the transmission system, such that the elements can be actuated in a co-ordinated manner.

During a calibration mode of operation, for example, the locking members 17 of each of the synchronizing units can be moved to an unlocked position. When the locking members 17 are in the unlocked position, the biasing elements 15 cause the male and female portions of each synchronizing unit 12 to be biased apart. As such, the functional length of each transmission link is increased (or decreased in some circumstances) to compensate for different functional distances between each respective element 14 and the common drive source 16. After a settling period during the unlocked stage of the calibration mode, e.g. after the synchronizing units have adjusted to the different functional distances, the synchronizing units can be locked, and the calibration mode exited. In one example the synchronizing units can all be moved to the unlocked position together or in parallel, adjusted to match the required functional length, and then locked together or in parallel. In another example, each synchronizing unit can be unlocked, adjusted and locked individually, before moving on to the next synchronizing unit.

In the example of FIG. 1, it can be seen that the height of the second element $14_2$ (which as shown in this example is greater than the height of the first element $14_1$, thus having a smaller effective functional distance between the element $14_2$ and the common drive source 16) has acted against the force of the biasing element $15_2$ which is trying to bias the female portion $13_{2A}$ and male portion $13_{2B}$ of the synchronizing unit $12_2$ apart, resulting in the functional length of the second transmission link $10_2$ being decreased compared to that of the first transmission link $10_1$. Also in this example, it can be seen that the height of the third element $14_N$ (which as shown in this example is less than the height of the first element $14_1$, thus having a larger effective functional distance between the element $14_N$ and the common drive source 16) has resulted in the biasing element $15_N$ biasing the female portion $13_{NA}$ and the male portion $13_{NB}$ of the synchronizing unit $12_N$ apart, resulting in the functional length of the third transmission link $10_N$ being increased compared to that of the first transmission link $10_1$. In this way, according to some examples the synchronizing units 12 act to change or alter the functional lengths of the transmission links which control different elements from a common drive source.

It is noted that although the example of FIG. 1 shows biasing elements 15 located between the male and female portions of the synchronizing units for biasing them apart, other biasing element arrangements may also be provided for biasing, the male and female portions apart, for example biasing elements arranged to pull the male and female portions apart (or to rotate male and female portions in a rotational synchronizing device described later). In some examples the biasing elements are strong enough to push or pull the male and female portions one against the other, preloading the whole transmission link by allowing relative movement between the male and female portions. In some examples the biasing elements are arranged to provide a controlled force, for example a similar or same force to the amount that the transmission link will withstand under normal operating conditions. In some example the biasing force may be modified (increased or decreased), for example if the transmission link inertia can affect the positional accuracy of the device due to inertial deflections. It is noted that any form of biasing elements may be used, including for example wire springs (e.g. traction, compression, torsion), or gas cylinders or springs, or hydraulic cylinders, magnets, electric motors (linear or rotational), or other biasing elements that can provide force while allowing relative movement.

It is also noted that although the example of FIG. 1 is shown as compensating for differences in the dimensions of the elements 14, the synchronizing units 12 may also compensate for dimensional differences or tolerances elsewhere in the transmission system, including deflections or deformations when transmission links are working under normal working loads or conditions.

In the examples described herein, the synchronizing units effectively provide an adjustable portion within a transmission link, which allows the length of the transmission link to be adjusted to match the functional length needed for a particular transmission link within the overall transmission system.

Thus, the example of FIG. 1 can act to compensate for different distances between the elements 14 and the common drive source 16, for example caused by different heights of elements 14, different lengths of transmission links 10, or other tolerances in the transmission system. For example, if the different transmission links have very different lengths through different rigidities or tolerances, examples described herein can absorb the positional error sources, including those that stem from rigidity issues.

In some examples, the female and male portions 13A, 13B may also be provided with different degrees of movement relative to one another when the locking member 17 is in the unlocked position. For example, a plurality of bias settings may be provided when the synchronizing unit 12 is operating in the unlocked mode of operation. The plurality of bias settings may be chosen in one example to cater for the different forces experienced in a particular application.

Figure 2:
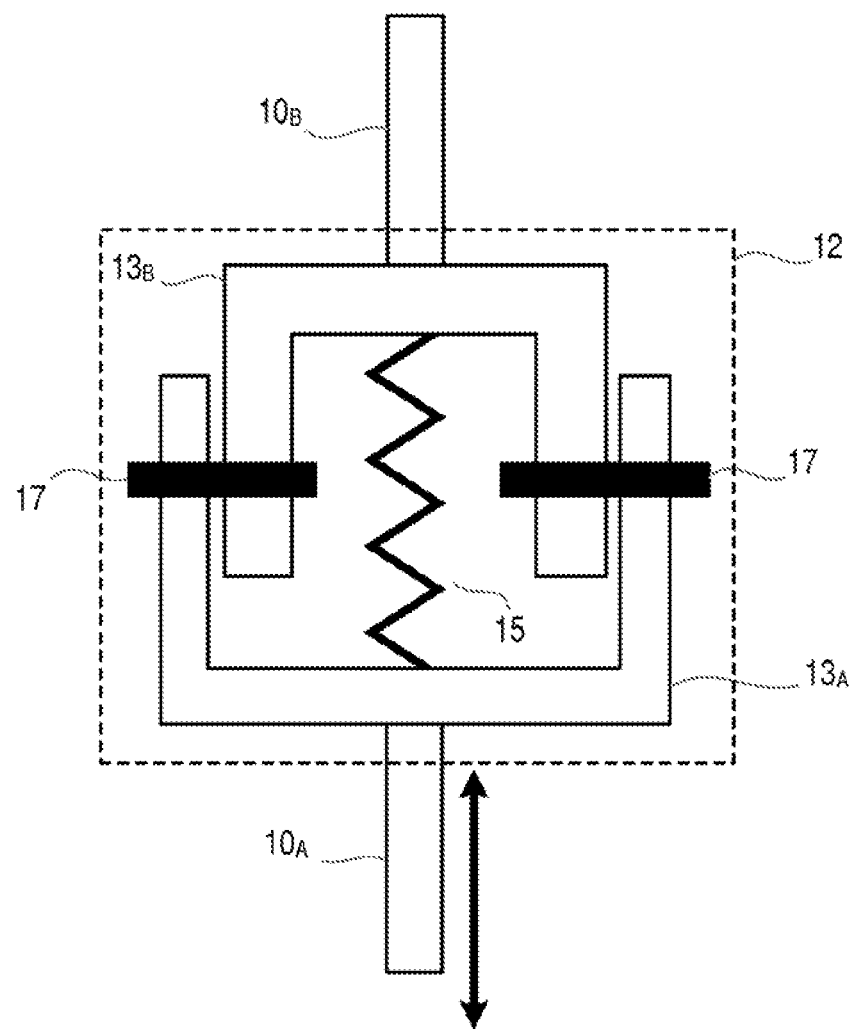
FIG. 2 is an example of a synchronizing unit for use with an assembly according to examples described herein.

FIG. 2 shows further details of a synchronizing unit 12 according to one example. As with FIG. 1, the synchronizing unit 12 comprises a device body 13 comprising a first portion $13_A$ (for example a female portion) coupled to a first side 10A of the transmission link, and a second portion 13B (for example a male portion) coupled to a second side $10_B$ of the transmission link 10. The synchronizing unit 12 comprises a biasing element 15 to bias the first and second portions $13_A$, $13_B$ apart. The synchronizing unit 12 further comprises a locking member 17 to allow movement of the first portion $13_A$ relative to the second portion $13_B$ when the locking member 17 is in an unlocked position, and prevent movement of the first portion $13_A$ relative to the second portion $13_B$ when the locking member 17 is in a locked position. In one example a locking member 17 allows free movement between male and female portions in the degree of freedom that is being preloaded by means of the biasing element, without interfering in the transmission link length which is being adjusted. In one example the design of a locking member takes account of the degree of freedom that needs to be locked. In some examples, a locking member acts to clamp the male and female portions when in the locked position, at any position along their relative movement path.

The locking members may be controlled manually, or automatically using a control mechanism, or both.

From the above it can be seen that, for a multilink transmission system which moves different elements in a coordinated manner with one source of power, by means of the examples described herein an accurate and coordinated or synchronized movement can be obtained.

Figure 3:
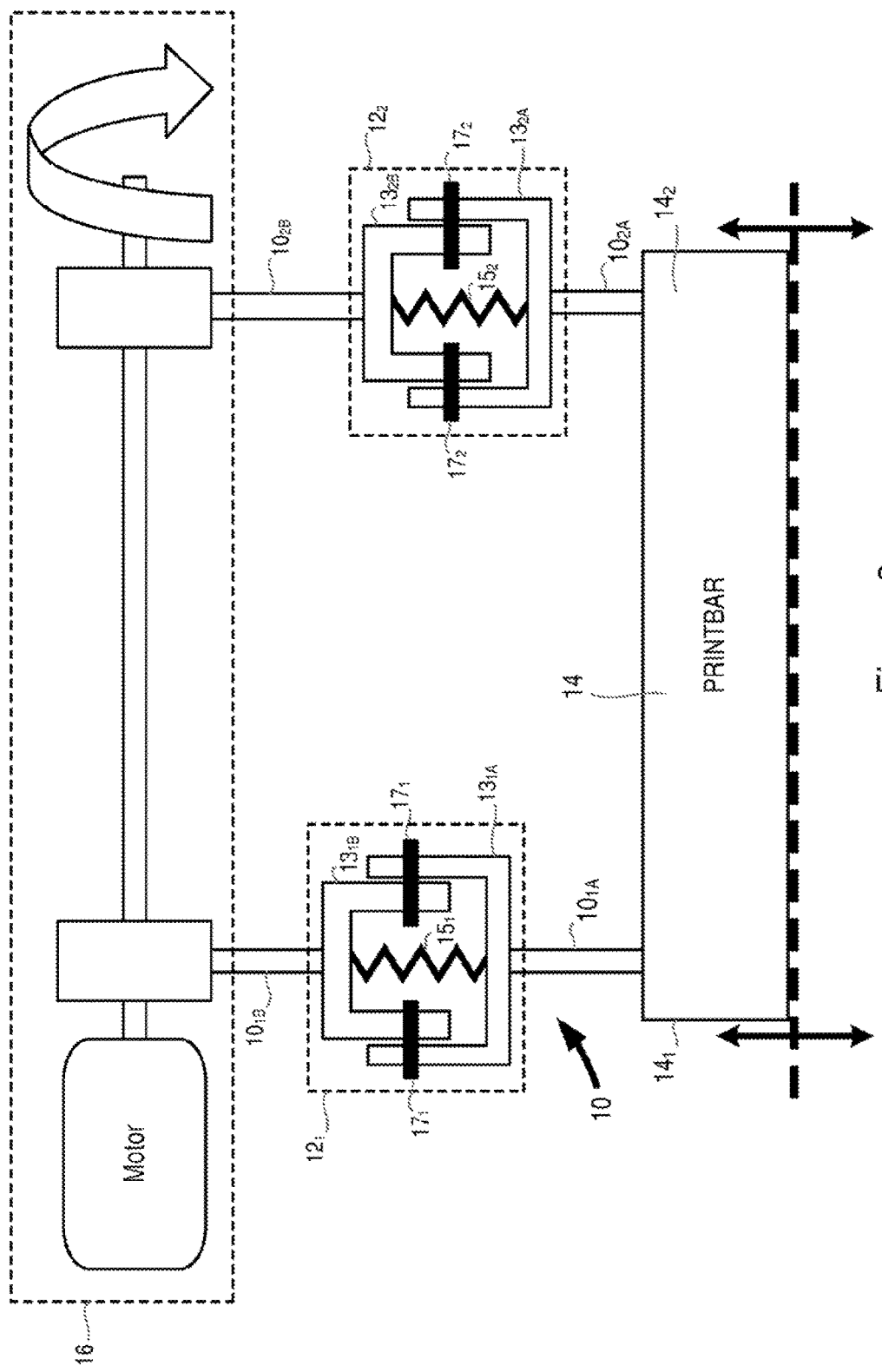
FIG. 3 is an example of another assembly according to the disclosure.

FIG. 3 shows an assembly according to another example, in which a common element 14, for example a printbar, is actuated from first and second ends using a common drive source 16, such as a common motor and associated drive gear. A printbar is a beam where the printheads are supported. The printbar beam is a mobile part that allows printheads to reach different positions for printing and servicing purposes.

The assembly of the example of FIG. 3 comprises at least first and second transmission links 10, each transmission link 10 controlling movement of a respective element 14 coupled to a first side $10_A$ of the transmission link 10, under control of a common drive source 16 coupled to a second side $10_B$ of the transmission link 10. In this example the respective elements, whose movement is being controlled, comprise elements that form part of a common element, for example portions or locations on a printbar. A synchronizing unit 12 is interposed between the first side $10_A$ and the second side 10B of each transmission link 10, to synchronize movement of the respective elements 14, for example the orientation of a printbar relative to a printzone 30, using the common drive source 16.

As with the example of FIG. 1, the synchronizing units 12 of FIG. 3 can be operated in a locked and an unlocked mode, with the synchronizing units set to compensate for any differences in functional distance or length when in the unlocked mode, which is then applied when operating in the locked mode. It is noted that additional transmission links may be provided.

The example of FIG. 3 therefore provides an accurate and coordinated way to move the first and second printbar ends. This enables the printbar to be controlled such that it remains parallel to a printzone 30, such that printheads coupled to the printbar also remain parallel to the printzone 30. As mentioned above in FIG. 1, in some examples the synchronizing units may be adjusted together, while in other examples they are adjusted individually. In one example the adjustment may be carried out by braking (or locking) the common drive source (e.g. braking and locking the motor), placing the synchronizing units in an unlocked mode, adjusting the transmission links (for example such that the printbar is at a desired orientation, such as parallel to the printzone), placing the synchronizing units in the locked mode, and releasing the common drive source (motor).

In the examples of FIGS. 1 to 3 the synchronizing units are applied in a transmission system involving linear movement. In other examples, such as that illustrated in FIG. 4a, the synchronizing units can be applied in a transmission system involving rotational movement.

Figure 4A:
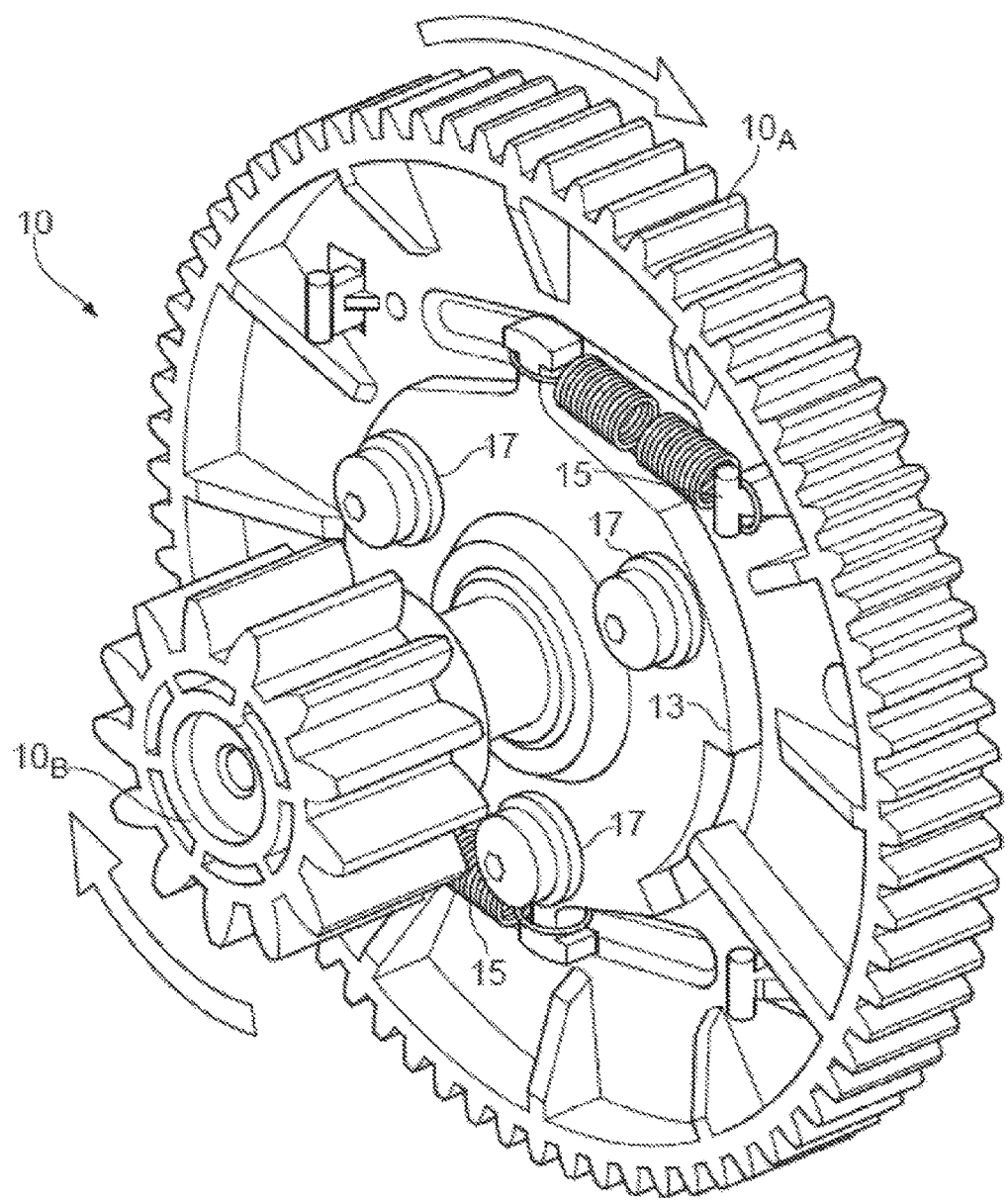
FIG. 4a is an example of another assembly according to the disclosure.

In FIG. 4a, there is shown a transmission link 10 for controlling movement of a respective element (not shown) coupled to a first side $10_A$ of the transmission link 10, under control of a common drive source (not shown) coupled to a second side $10_B$ of the transmission link 10, or vice versa. Other such transmission links may also be driven by the common drive source, each transmission link controlling movement of an associated element. A synchronizing unit (comprising a device body 13, biasing element 15 and locking member 17) is interposed between the first side $10_A$ and the second side $10_B$ of the transmission link 10, to synchronize movement of an element driven by a common drive source, with other elements driven by the common drive source via transmission links 10 similar to that of FIG. 4a.

Thus, the transmission link in the example of FIG. 4a comprises a rotatable transmission link to control rotational movement about an axis, and wherein the synchronizing unit comprises a device body comprising a first portion coupled to one side of the rotatable transmission link, and a second portion coupled to the other side of the rotatable transmission link. The biasing element biases the first and second portions apart in a rotational direction. The locking member allows movement of the first portion relative to the second portion when the locking member is in an unlocked position, and prevents movement of the first portion relative to the second portion when the locking member is in a locked position.

Figure 4B:
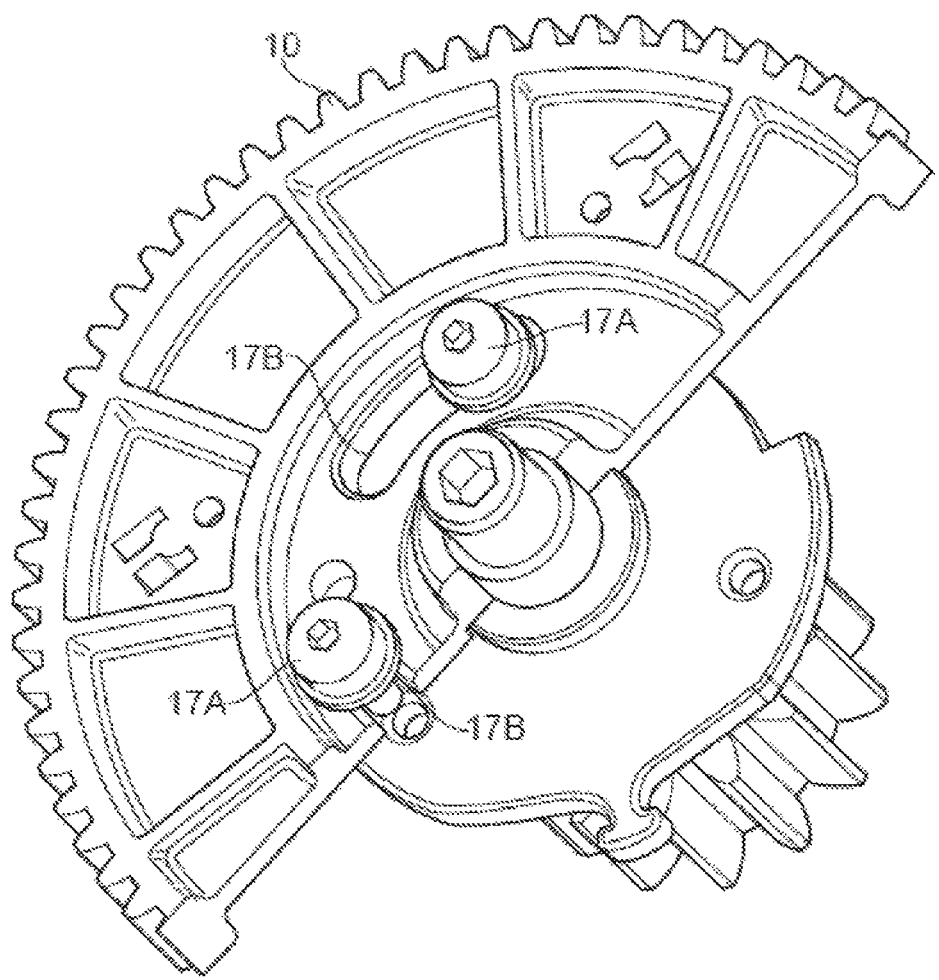
Figure 4C:
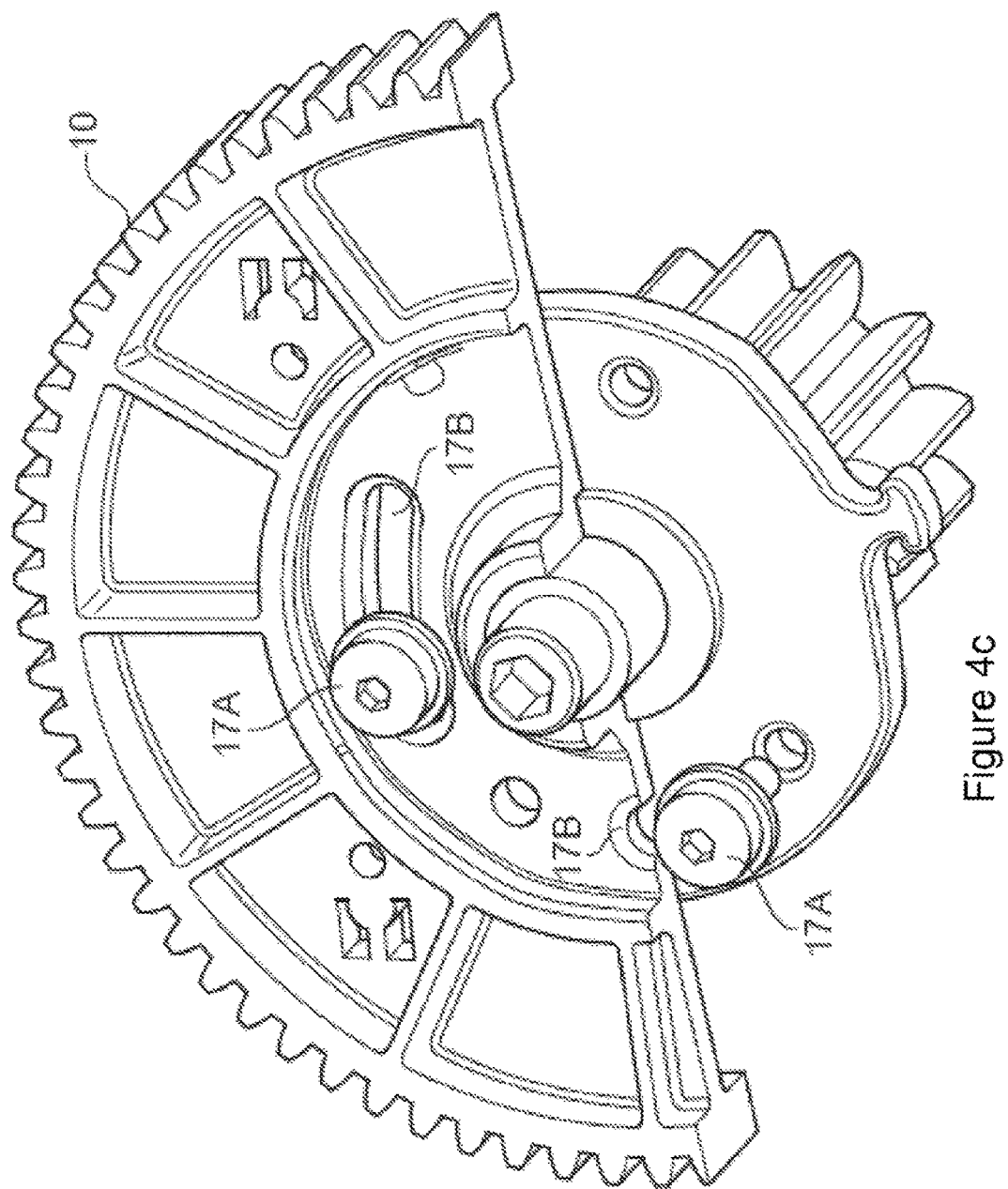

FIGS. 4b and 4c shows further details of a locking member 17 according to the example of FIG. 4, of the type comprising a fastener, such as a screw $17_A$, which cooperates with a slot $17_B$. FIG. 4b shows the transmission link 10 adjusted such that the screw $17_A$ lies towards one end of the slot $17_B$ (for example when the male and female portions of the transmission link 10 are at the end of one range of their relative movement), while FIG. 4c shows the transmission link 10 adjusted such that the screw $17_A$ lies towards the other end of the slot $17_B$ (for example when the male and female portions of the transmission link 10 are at the other end of their range of relative movement). In this example the screw can be unscrewed to place the locking member in an unlocked mode, to allow movement of the male and female portions of the transmission link 10, and the screw then tightened when the screw is at the appropriate point along the slot, i.e. when the functional distance is adjusted to the appropriate point by the biasing element(s), to place the locking member in the locked mode. It is noted that other locking member arrangements can also be used in other examples.

Thus, as with the examples of FIGS. 1 to 3, the synchronizing unit can be operated in an unlocked mode of operation to allow the synchronizing unit to compensate for any differences in functional distance, e.g. rotational distance in this example, in the transmission system. The differences in functional distance, or functional length, may be caused for example by dimensional factors such as tolerances of component parts that constitute the transmission system, mechanism plays between component parts, backlash in the transmission system, deflections in various components parts, or other factors.

Figure 5:
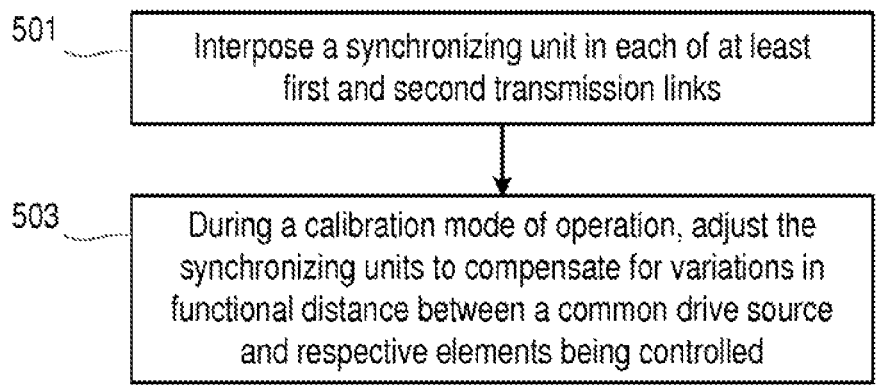
FIG. 5 shows an example of a method according to the disclosure.

FIG. 5 shows a method according to another example, to compensate for different functional distances in a transmission system in which movement of at least first and second elements is controlled by a common drive source 16 via at least first and second transmission links. The method comprises interposing a synchronizing unit 12 in each of the at least first and second transmission links, as shown in 501. During a calibration mode of operation 503, the synchronizing units 12 are adjusted to compensate for variations in functional distance between the common drive source 16 and the respective elements being controlled.

Figure 6:
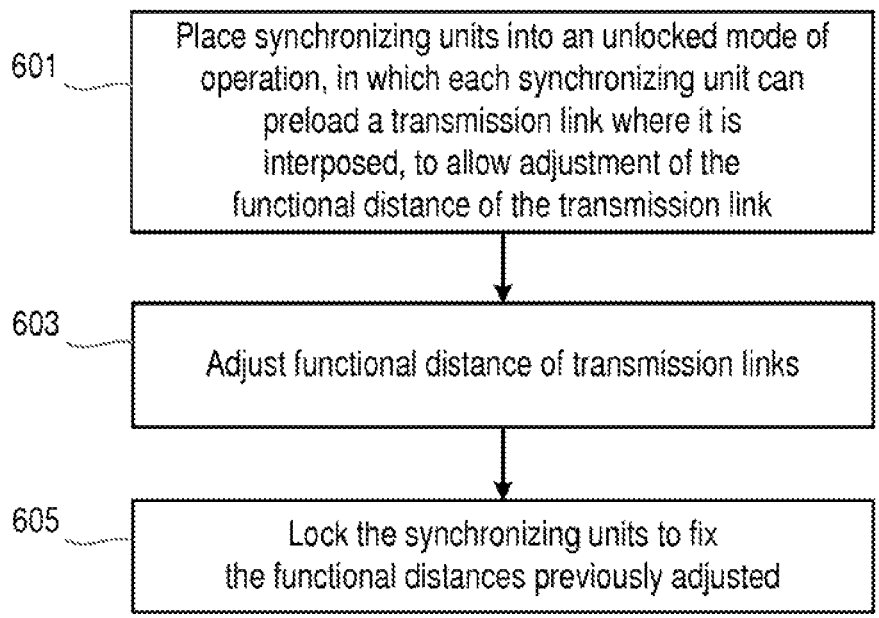
FIG. 6 shows a method according to another example.

Referring to FIG. 6, in one example, the method comprises placing synchronizing units into an unlocked mode of operation, in which each synchronizing unit can preload a transmission link where it is interposed, to allow adjustment of the functional distance of the transmission link, 601, adjusting the functional distances of the transmission links, 603, and locking the synchronizing units to fix the functional distances previously adjusted, 605.

In the methods of FIG. 5 or 6, a transmission link may comprise a linear transmission link or a rotatable transmission link.

In some examples the transmission is set and retained in a functional position, and the lock/unlock members released, such that all force generators or biasing elements will place the transmission links under functional stresses, simulating deformations and absorbing all existing plays and backlashes. Then, the lock/unlock members can be locked, holding each transmission link in the functional lengths and position that enable them to work in a coordinated manner under functional conditions.

In another example, a method comprises placing the synchronizing units into an unlocked mode of operation, in which each synchronizing unit expands or contracts to a functional distance of its corresponding transmission, allowing the synchronizing units to settle to the functional distances of their respective transmission links, and locking the synchronizing units to fix the functional distances.

By means of some examples described above, when a multilink transmission system, for example in a printer, has to move different elements in a coordinated manner using a common source of power, the examples enable positional error sources to be absorbed, such positional error sources comprising for example functional deformations, variability in dimensional tolerances, or differential rigidities in different components. Therefore, according to at least some examples, an accurate and coordinated movement can be provided Thus, when a mechanism comprises a common mechanical power source that moves more than one element (or different parts of the same element), the examples enable such element(s) to be actuated in a more precise coordinated fashion, such that dimensional issues such as tolerances, mechanisms plays, backlash, deflections, etc, can be compensated for.

The examples described herein allow the synchronizing of the movement of transmissions that transfer power or movement to a number of elements that are to be actuated in a co-ordinated manner. For example, the examples described herein may be used to control movement of a printbar lift mechanism.

The examples described herein can be used with both linear and rotational movements, for example by interposing an appropriate synchronizing unit in a respective transmission link. The synchronizing units may also be used in combination with both linear and rotational movement control, In some examples, a transmission link comprises a fixed functional length when the assembly is operating in a locked mode of operation, and wherein the functional length of the transmission link can be changed when the assembly is operating in an unlocked mode of operation.

In some examples, the synchronizing units are structured such that the degree of possible relative movement between first and second portions of a device body of a synchronizing unit is selected to be greater than a possible dimensional tolerance to be compensated for.

In one example, a printer apparatus comprises an assembly or synchronizing unit as described in any of the examples described herein.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An assembly comprising:
    a plurality of transmission links, each respective transmission link of the plurality of transmission links extending along a respective axis between a common drive source and a respective element of a plurality of elements, the common drive source to control movement of the plurality of elements, the respective element to engage a first side of the respective transmission link, and the common drive source to engage a second side of each of the plurality of transmission links; and
    a plurality of synchronizing units, each respective synchronizing unit of the plurality of synchronizing units interposed between the first side and the second side of the respective transmission link, each respective synchronizing unit comprising a first member moveable relative to a second member when the first and second members are unlocked from one another, and the first member and the second member being moveable relative to one another to compensate for a difference in distances between the common drive source and the plurality of elements to synchronize movement of the plurality of elements by the common drive source.

2. The assembly of claim 1, wherein each respective synchronizing unit is switchable between a locked mode of operation and an unlocked mode of operation, wherein:
    in the locked mode of operation the respective synchronizing unit is to move the respective element in direct relation to movement of the respective transmission link into which the respective synchronizing unit is interposed; and
    in the unlocked mode of operation the first and second members of the respective synchronizing unit are unlocked from one another, and the respective synchronizing unit allows movement of the first side of the respective transmission link relative to the second side of the respective transmission link, the movement being independent of the common drive source, to compensate for the difference in the distances between the common drive source and the plurality of elements.

3. The assembly of claim 1, wherein a first transmission link of the plurality of transmission links comprises an elongated shaft to control linear movement along the respective axis of the first transmission link, and wherein a first synchronizing unit interposed in the first transmission link comprises:
    a device body comprising the first member coupled to one side of the elongated shaft, and the second member coupled to another of the elongated shaft;
    a biasing element to bias the first and second members apart; and
    a locking member to allow movement of the first member relative to the second member when the locking member is in an unlocked position, and prevent movement of the first member relative to the second member when the locking member is in a locked position.

4. The assembly of claim 3, wherein the first member is fixedly coupled to the first side of the first transmission link, and the second member is fixedly coupled to the second side of the first transmission link.

5. The assembly of claim 4, wherein the first and second members comprise different degrees of movement relative to one another when the locking member is in the unlocked position.

6. The assembly of claim 1, wherein each respective transmission link comprises a fixed functional length when operating in a locked mode of operation, and wherein the functional length of the respective transmission link can be changed when operating in an unlocked mode of operation.

7. The assembly of claim 1, wherein each element of the plurality of elements is a separate element whose movement is controlled by a respective transmission link of the plurality of transmission links.

8. The assembly of claim 1, wherein each element of the plurality of elements forms part of a common element whose movement is controlled by the plurality of transmission links.

9. The assembly of claim 8, wherein the common element comprises a printbar.

10. The assembly of claim 1, wherein the common drive source is positioned on a first side of the plurality of elements, and the respective axes along which the plurality of transmission links extend are parallel to one another.

11. The assembly of claim 1, wherein the first member and the second member of a first synchronizing unit of the plurality of synchronizing units are moveable relative to one another when unlocked by a first amount to set a target distance between the common drive source and a first element of the plurality of elements, and wherein the first member and the second member of a second synchronizing unit of the plurality of synchronizing units are moveable relative to one another when unlocked by a second amount to set the target distance between the common drive source and a second element of the plurality of elements, the second amount different from the first amount.

12. The assembly of claim 11, wherein the first member and the second member of the first synchronizing unit are locked relative to one another after movement by the first amount, and wherein the first member and the second member of the second synchronizing unit are locked relative to one another after movement by the second amount.

13. An assembly comprising:
a plurality of elements;
a common drive source to control movement of the plurality of elements;
a plurality of transmission links, each respective transmission link of the plurality of transmission links extending along a respective axis between a common drive source and a respective element of the plurality of elements, the respective element to engage a first side of the respective transmission link, and the common drive source to engage a second side of each of the plurality of transmission links; and
a plurality of synchronizing units, each respective synchronizing unit of the plurality of synchronizing units interposed between the first side and the second side of the respective transmission link, each respective synchronizing unit comprising a first member moveable relative to a second member when the first and second members are unlocked from one another, and the first member and the second member being moveable relative to one another to compensate for a difference in distances between the common drive source and the plurality of elements to synchronize movement of the plurality of elements by the common drive source.

14. The assembly of claim 13, wherein the common drive source is positioned on a first side of the plurality of elements, and the respective axes along which the plurality of transmission links extend are parallel to one another.

15. The assembly of claim 13, wherein the first member and the second member of a first synchronizing unit of the plurality of synchronizing units are moveable relative to one another when unlocked by a first amount to set a target distance between the common drive source and a first element of the plurality of elements, and wherein the first member and the second member of a second synchronizing unit of the plurality of synchronizing units are moveable relative to one another when unlocked by a second amount to set the target distance between the common drive source and a second element of the plurality of elements, the first amount different from the second amount.

16. The assembly of claim 15, wherein the first member and the second member of the first synchronizing unit are locked relative to one another after movement by the first amount, and wherein the first member and the second member of the second synchronizing unit are locked relative to one another after movement by the second amount.

* * * * *

UNITED STATES PATENT AND TRADEMARK OFFICE
CERTIFICATE OF CORRECTION

PATENT NO. : 10,464,356 B2
APPLICATION NO. : 15/546335
DATED : November 5, 2019
INVENTOR(S) : Eduardo Ruiz Martinez et al.

Page 1 of 1

It is certified that error appears in the above-identified patent and that said Letters Patent is hereby corrected as shown below:

On the Title Page

In Column 1, item (71), Applicant, Lines 3-7, after "TX (US);" delete "Eduardo Ruiz Martinez, Sant Cugat del Valles (ES); Ernesto Carrera Moran, Sant Cugat del Valles (ES); Alfons Lobete Camps, Sant Cugat del Valles ES"

Signed and Sealed this
Third Day of March, 2020

Andrei Iancu
*Director of the United States Patent and Trademark Office*